United States Patent
Laurent et al.

(12) 
(10) Patent No.: US 8,564,554 B2
(45) Date of Patent: Oct. 22, 2013

(54) METHOD FOR CONTROLLING A TOUCH SURFACE CONTROL DEVICE AND ELECTRIC TOUCH SURFACE CONTROL DEVICE INCLUDING MEANS FOR IMPLEMENTING SAID METHOD

(75) Inventors: Patrice Laurent, Annemasse (FR); Aymeric Dunoyer, Annemasse (FR); Bruno Cottarel, Annemasse (FR); Philippe Barathon, Annemasse (FR)

(73) Assignee: DAV, Creteil (FR)

( * ) Notice: Subject to any disclaimer, the term of this patent is extended or adjusted under 35 U.S.C. 154(b) by 388 days.

(21) Appl. No.: 12/681,627

(22) PCT Filed: Oct. 6, 2008

(86) PCT No.: PCT/EP2008/063357
§ 371 (c)(1),
(2), (4) Date: Oct. 15, 2010

(87) PCT Pub. No.: WO2009/047235
PCT Pub. Date: Apr. 16, 2009

(65) Prior Publication Data
US 2011/0025648 A1    Feb. 3, 2011

(30) Foreign Application Priority Data
Oct. 8, 2007    (FR) .................................... 07 07055

(51) Int. Cl.
*G06F 3/041*    (2006.01)
*G06F 3/01*    (2006.01)

(52) U.S. Cl.
USPC .......................................... 345/173; 715/701

(58) Field of Classification Search
USPC .................... 345/156–184; 715/701
See application file for complete search history.

(56) References Cited

U.S. PATENT DOCUMENTS

| | | | |
|---|---|---|---|
| 4,810,992 A | 3/1989 | Eventoff | |
| 5,008,497 A | 4/1991 | Asher | |
| 5,739,811 A * | 4/1998 | Rosenberg et al. | 345/161 |
| 6,285,351 B1 * | 9/2001 | Chang et al. | 345/156 |
| 6,300,937 B1 * | 10/2001 | Rosenberg | 345/156 |
| 6,340,936 B1 | 1/2002 | McGaffey et al. | |

(Continued)

FOREIGN PATENT DOCUMENTS

| | | |
|---|---|---|
| EP | 0 541 102 A1 | 5/1993 |
| EP | 1 241 558 A2 | 9/2002 |
| EP | 1 748 350 A2 | 1/2007 |

(Continued)

OTHER PUBLICATIONS

International Search Report w/translation from PCT/EP2008/063357 dated Jun. 10, 2009 (6 pages).

*Primary Examiner* — Bipin Shalwala
*Assistant Examiner* — Steven Holton
(74) *Attorney, Agent, or Firm* — Osha Liang LLP

(57) ABSTRACT

The invention relates to a method for controlling a touch surface control device, including at least one step comprising the generation of sensory feedback corresponding to the detection of a pressure applied by a user on the touch surface, said sensory feedback comprising haptic feedback and acoustic feedback. The invention is characterized in that the generation of the acoustic feedback is initiated after the generation of the haptic feedback once a characteristic value of the haptic feedback has exceeded a pre-defined threshold. The invention also relates to an electric control device having a touch surface, characterized in that it includes means for implementing said method (1).

12 Claims, 4 Drawing Sheets

(56) References Cited

U.S. PATENT DOCUMENTS

Figure 1:
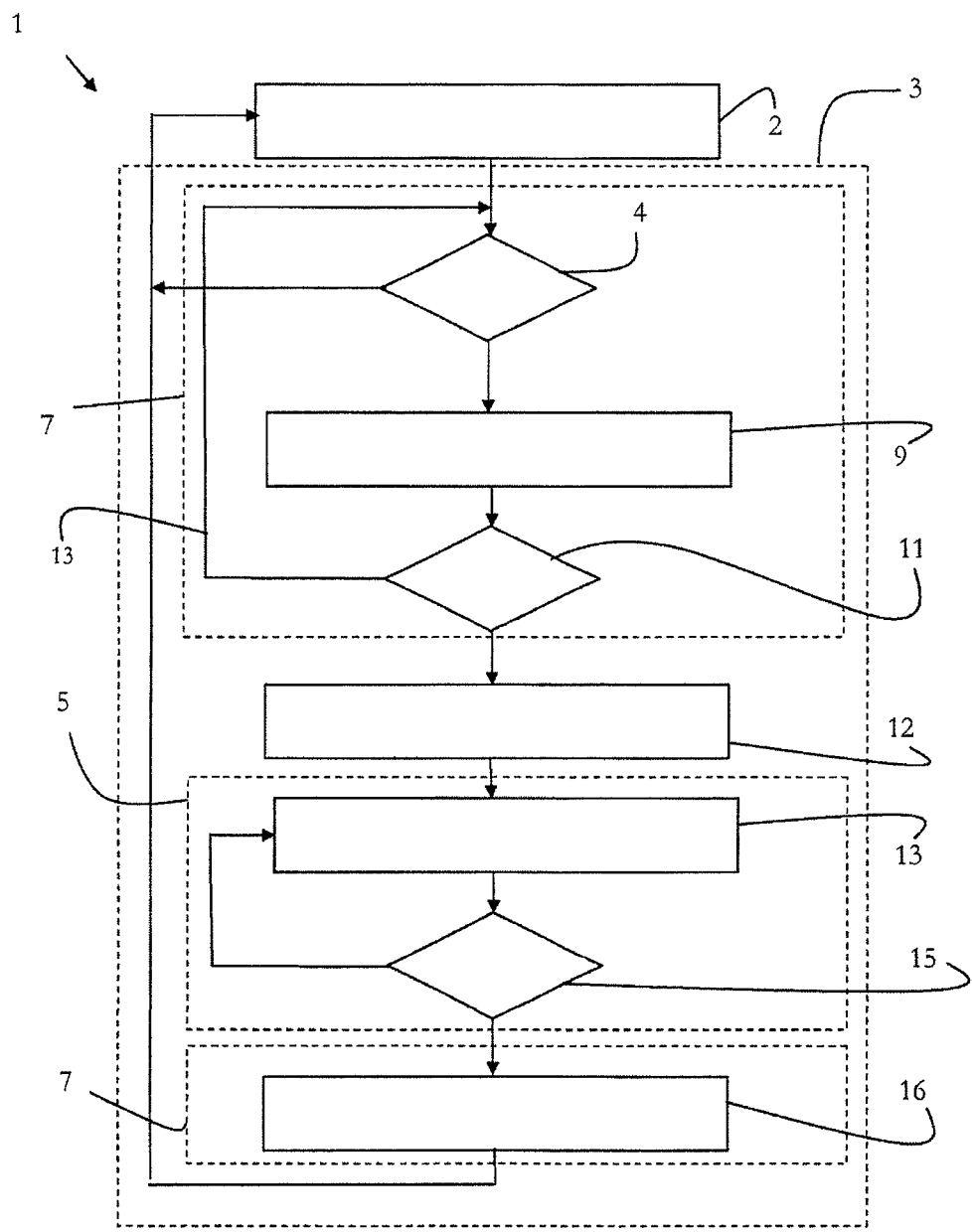

| | | |
|---|---|---|
| 6,703,550 B2 * | 3/2004 | Chu ................................ 84/609 |
| 2006/0031765 A1 | 2/2006 | Roderick et al. |
| 2007/0024593 A1 | 2/2007 | Schroeder |

FOREIGN PATENT DOCUMENTS

| | | |
|---|---|---|
| FR | 2 683 649 A1 | 5/1993 |
| FR | 2 847 527 A1 | 5/2004 |
| GB | 2 402 105 A | 12/2004 |

* cited by examiner

METHOD FOR CONTROLLING A TOUCH SURFACE CONTROL DEVICE AND ELECTRIC TOUCH SURFACE CONTROL DEVICE INCLUDING MEANS FOR IMPLEMENTING SAID METHOD

The present invention relates to a touch-sensitive surface control method comprising a step in which a sensory feedback is generated corresponding to a detection of a user pressing on the touch-sensitive surface.

The invention also relates to an electric control device with a touch-sensitive surface comprising means for applying a control of such a method, for example a control of an electric or electronic member of a motor vehicle.

Control devices with a touch-sensitive surface make it possible to detect a pressure of the finger of a user and, depending on the force exerted on the surface and/or on the position of the detected pressure and/or on the subsequent movement of this pressure on the surface, to initiate a particular type of action or of member control.

Control devices are known, for example, comprising a sensor the touch-sensitive surface of which is sensitive to a variation of tactile pressure, such as a sensor using pressure-sensitive resistors (also known as an FSR, for "Force-Sensing Resistor", sensor).

Such sensors are for example known by the name of "digitizer pad" and the following documents: U.S. Pat. No. 4,810,992, U.S. Pat. No. 5,008,497, FR 2683649 or else EP 0 541 102 are cited as prior art.

These sensors comprise a touch-sensitive surface comprising semiconductive layers sandwiched between, for example, a conductive layer and a resistive layer.

By exerting a pressure on the touch-sensitive surface, the ohmic resistance of the touch-sensitive surface diminishes thus making it possible, by the application of an appropriate voltage, to measure the pressure applied and/or to locate the place where the pressure is exerted.

Control devices of this type are also known that comprise means for generating a sensory information feedback, such as a vibration and/or a sound, in order to signal to the user that the detection has been made and the switching carried out.

However, it may happen that the sensory feedback is incorrectly perceived or is incorrectly interpreted by the user. The latter is then no longer sure of knowing whether his command has been registered nor with what action the sensory feedback is associated.

The cause of this defect was not known and remained unexplained.

The inventors have therefore analyzed the methods of the prior art in detail and have found surprisingly that there is a lag of approximately ten milliseconds between the moment when it is desired to generate a haptic feedback and the moment when, for example, the corresponding vibration is perceived by the user.

The object of the present invention is therefore to propose a method and an electric control device improving the sensing of the user, allowing him thereby to better discern to what the sensory feedback corresponds.

Accordingly, the object of the invention is a method for controlling a control device with a touch-sensitive surface comprising at least one step in which a sensory feedback is generated which corresponds to a detection of a user pressing on the touch-sensitive surface and which comprises a haptic feedback and an acoustic feedback, characterized in that the generation of the acoustic feedback is begun after that of the haptic feedback, from the moment when a value characteristic of the haptic feedback has exceeded a predefined threshold.

A further object of the invention is an electric control device with a touch-sensitive surface, characterized in that it comprises means for applying said method.

Figure 2:
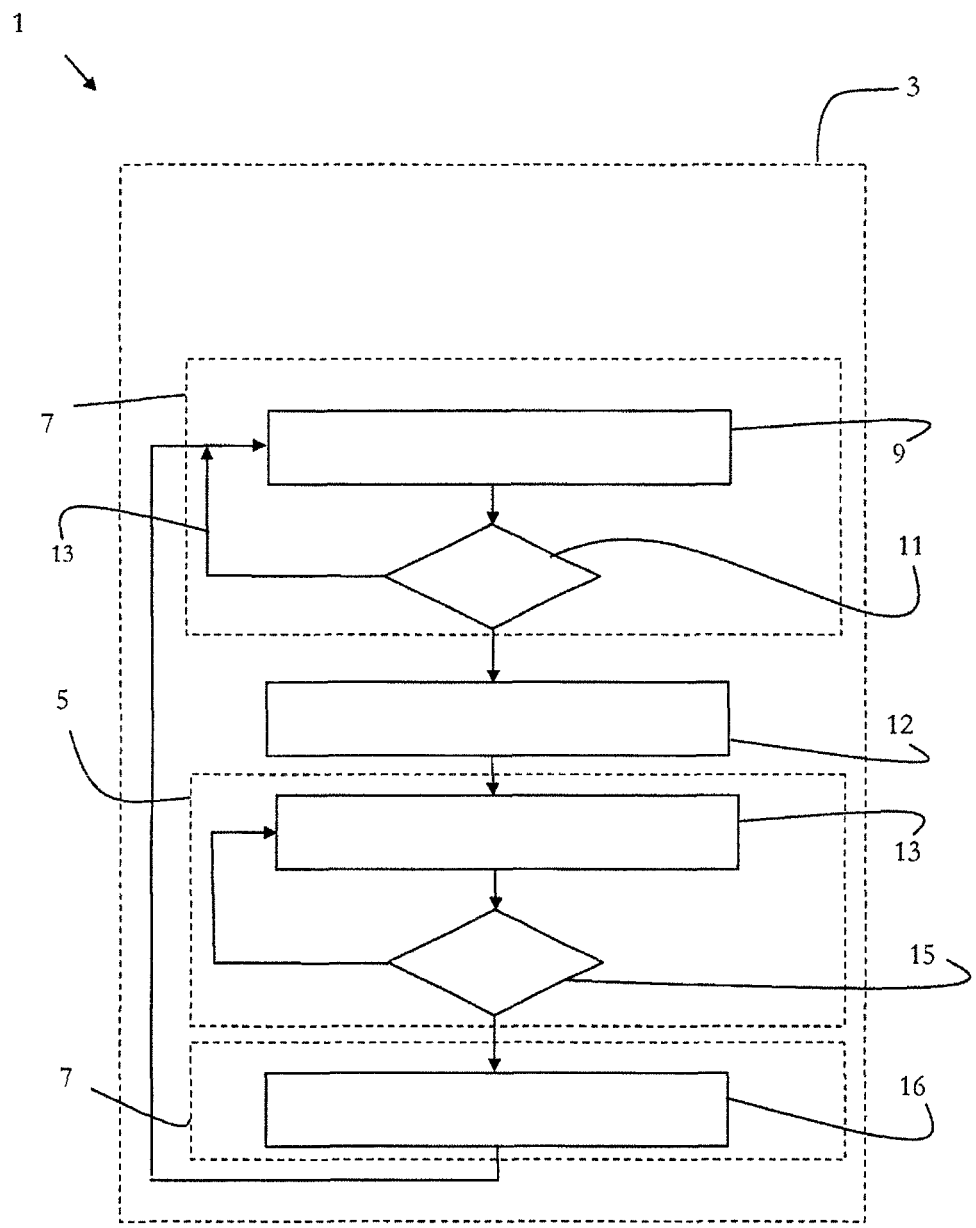
Figure 3:
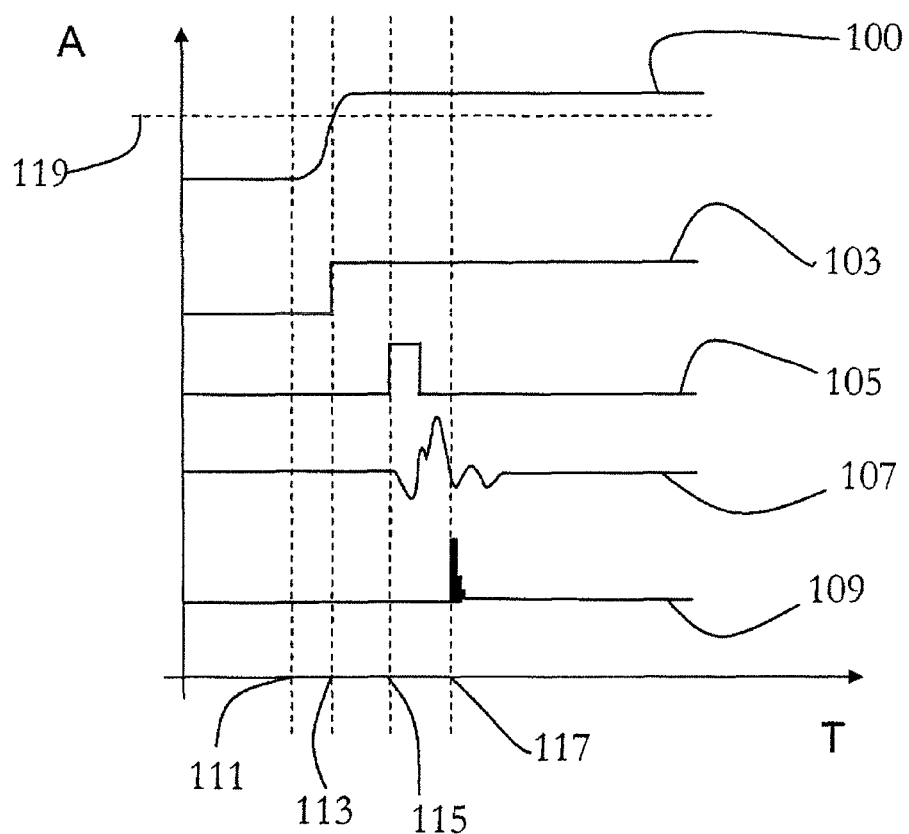
Figure 4:
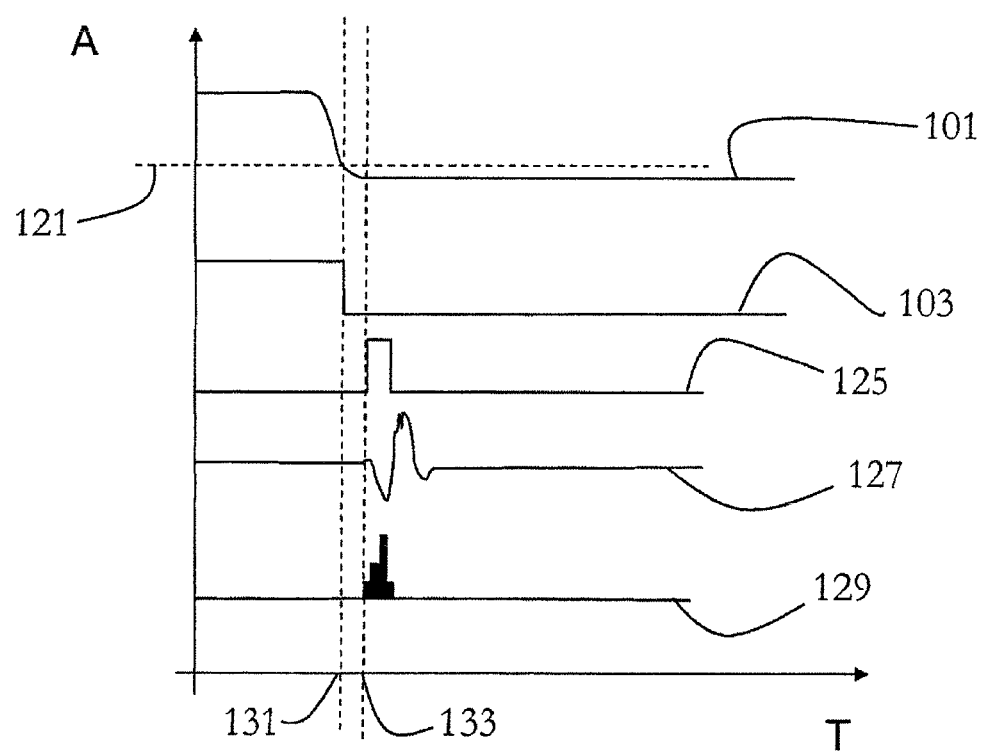

Other advantages and features will appear on reading the description of the invention and the appended drawings in which:

FIG. 1 is a flow chart illustrating various steps of the method according to a particular embodiment of the invention, FIG. 2 is a flow chart illustrating a second embodiment of the method of the invention, FIGS. 3 and 4 represent two diagrams of the change in the characteristic parameters of a control device according to the invention as a function of time, during a detection step of said method.

In these figures, identical elements bear the same reference numbers.

For the purposes of clarity, the steps of the method are numbered 1 to 16 and the elements of the diagrams are numbered from 100.

The control method according to the invention is capable of controlling, for example, a control device of a motorized mechanism (not shown) for opening and/or closing an opening element, such as a window of a motor vehicle, a sunroof or else the trunk/tailgate/motorized sliding door of a vehicle, or an electronic member for a multimedia screen or an air-conditioning system.

Naturally, this method can be adapted to any other electric control.

The control method comprises at least one step in which a sensory feedback is generated which corresponds to a detection of a user pressing on the touch-sensitive surface.

The sensory feedback comprises a haptic feedback, such as a feedback of the vibratory type, of the blistering type or of the button type, and an acoustic feedback.

According to the invention, the generation of the acoustic feedback is begun after that of the haptic feedback, from the moment when a value characteristic of the haptic feedback has exceeded a predefined threshold, so that the haptic feedback and the acoustic feedback are perceived substantially simultaneously by the user.

Preferably, the predefined threshold to be exceeded is a fraction of the amplitude or of the total duration of the haptic feedback.

Therefore, by offsetting in time the generation of the acoustic feedback and that of the haptic feedback, a sensory feedback is obtained in which the perception of the haptic and acoustic feedbacks is simultaneous, which makes it possible to improve the content of the information feedback of the command.

For example, if the haptic feedback is generated for a duration D, the generation of the acoustic feedback is begun from a duration substantially between 0.4*D and 0.7*D, preferably 0.5*D.

Preferably, the generation of the acoustic feedback is offset so that the maximum amplitude of the haptic feedback coincides with the maximum amplitude of the acoustic feedback.

Advantageously, and as shown in FIG. 1, the control method 1 comprises an initial standby step 2 in which the control device is placed in a standby state.

The method 1 also comprises a detection step 3 in which a pressure on the touch-sensitive surface of the control device (diamond 4) is detected.

Then, when a pressure has been detected on the touch-sensitive surface, the value of at least one parameter characteristic of the detected pressure (rectangle 9) is checked and it is compared with at least one predefined reference value.

For example, it is compared with a set of predefined reference values (diamond 11).

If the value of the parameter is included in this set of predefined reference values or, if the value of the parameter is equal to or greater than the reference value, a first sensory feedback (rectangle 12) is generated and the control device is placed in an active pressure state 5, and then the specified control is actuated.

On the other hand, if the value of the parameter is less than the reference value, a further test is made as to whether a pressure has been detected on the touch-sensitive control surface (diamond 4).

If a pressure is still detected, the method is reiterated by again checking the value of at least one parameter characteristic of the detected pressure (rectangle 9) and so on.

If, on the other hand, the pressure is no longer detected, the device returns to the standby state (rectangle 2).

Advantageously, in the detection step 3 for which the control device is placed in an active pressure state 5, the value of at least one parameter characteristic of the detected pressure (rectangle 13) is checked and it is compared with a predefined reference value (diamond 15) or with a set of predefined reference values.

When the value of the parameter is below the predefined reference value or when the value of the parameter is outside the set of predefined reference values, a second sensory feedback (rectangle 16) is generated and the control device is placed in an inactive pressure state 7 and in the initial standby step 2.

The variation in the value of the characteristic parameter is not registered so long as it is not below the predefined reference value or outside the set of predefined reference values.

The return to the inactive pressure state 7 allows the method 1 to register a new control from the user.

Therefore, the method 1 makes it possible, on the one hand, to certify that the detected pressure must be registered and, on the other hand, to inform the user precisely of the beginning and the end of the registering of this control, making its application secure.

In this way, the method makes it possible to prevent the touch-sensitive surface of the device from detecting an unintentional pressure and activating a control not desired by the user, originating, for example, from an unintended contact of the touch-sensitive surface.

According to a second embodiment of the method and as illustrated in FIG. 2, the method comprises a detection step 3 in which the value of at least one parameter characteristic of a pressure (rectangle 9) is checked directly, and then it is compared with a predefined reference value (diamond 11) or with a set of predefined values.

If the value of the parameter is equal to or greater than said reference value or included in the set of predefined values, the control device is placed in an active pressure state 5 and a first sensory feedback (rectangle 12) is generated.

Otherwise, the value of at least one parameter characteristic of a pressure (rectangle 9) is again checked.

The other steps of the method are similar to those of the method illustrated in FIG. 1.

Advantageously, the characteristic parameter is the measured force of the detected pressure.

Preferably, the predefined reference value of the force of the pressure allowing the transition to the active pressure state 5 is greater than or equal to the predefined reference value of the force of the pressure allowing the transition to the inactive pressure state 7.

Provision may also be made for the characteristic parameter to be the measured duration D of the detected pressure.

Advantageously, the set of predefined reference values comprises at least one predefined pressure force, one predefined pressure duration or one predefined position surface of the detected pressure.

In the case of an electric switch of the button type, the acoustic feedback can evoke the noise of actuation of a mechanical button.

The acoustic feedback may also be representative of the controlled function.

It is also possible to envisage that the first and the second haptic feedbacks are identical.

Alternatively, a first sensory feedback is provided in which the time lag between the acoustic feedback and the haptic feedback is greater than for the second sensory feedback.

The graphs 3 and 4 illustrate an exemplary embodiment of the method 1 as previously described with, in FIG. 3, the representation of a detection step 3 in which the control device switches from the inactive pressure state 7 to the active pressure state 5.

Conversely, in FIG. 4, the control device switches from the active pressure state 5 to the inactive pressure state 7.

The graph of FIG. 3 comprises, as ordinated, the amplitudes A of the signals of parameters of the control device and, as abscissa, the time T.

In this example, the switching to the active pressure state 5 takes place when the measurement of the detected pressure force becomes greater than or equal to a reference value.

The graph shows the curve 100 representing the pressure force over time.

At the moment 111, the curve 100 begins to change, which signals the presence of a pressure. When the value of the force is greater than the predefined amplitude value 119, that is to say at the moment 113, the control device switches to the active pressure state 5.

The curve 103 schematizes the state of the detected pressure. From the moment 113, the curve 103 indicates the active pressure state 5.

Following that, a control can be registered and actuated and a first sensory feedback is sent from the moment 115 to the user.

The first sensory feedback of the example of this graph comprises a haptic feedback of the vibratory type and an acoustic feedback.

This sensory feedback is schematized by the curves 105, 107 and 109 of FIG. 3.

The curve 105 represents the actuation setpoint of a vibrator and the curve 107 the acceleration of the touch-sensitive surface, representative of the vibratory feedback perceived by the user.

The actuation setpoint of the vibration is activated with a time lag to the change of state of the detected pressure of preferably less than 20 milliseconds.

The duration D of the vibration of the first haptic feedback is preferably between 10 and 50 milliseconds.

The acoustic feedback is schematized by the curve 109; it is preferably isolated and is, in this example, generated from half of the duration D of the vibration (from the moment 117).

The graph of FIG. 4 shows, as ordinate, the amplitudes A of the signals of parameters of the control device and, as abscissa, the time T.

In this illustration, the control device, initially in the active pressure state 5, switches to the inactive pressure state 7 when the measurement of the detected pressure force (curve 101) is less than a reference value schematized by the dashed line 121.

Following this (see curve 103, at the moment 131), a new control can be registered and a second sensory feedback is sent to the user.

The second sensory feedback is schematized by the curves 125, 127 and 129 of FIG. 4.

The curve 125 represents the actuation setpoint of the vibrator at the moment 133 and the curve 127 schematizes the haptic feedback, for example of the vibratory type, with a time lag from the change of state of preferably less than 20 milliseconds.

The duration D of the vibration of the second sensory feedback is preferably between 10 and 50 milliseconds.

This second sensory feedback comprises an acoustic feedback (curve 129), preferably isolated, generated with a time lag to the vibration setpoint, substantially in the first half of the duration D of the vibration, for example at the moment 133, or after 0.4*D.

Moreover, the invention also relates to an electric control device comprising means for applying the method, such as actuators capable of generating a vibration or such as sound means capable of emitting an acoustic feedback.

Preferably, these means also comprise a processing unit for, on the one hand, the management of the means for applying the method and, on the other hand, for checking the detection of a pressure and for checking the parameter characteristic of the detected pressure.

The processing unit may also be capable of storing a predefined reference value and may also comprise means for comparing the characteristic parameter with the predefined reference value.

Advantageously, the electric control device comprises a sensor having a touch-sensitive surface sensitive to a variation of tactile pressure, such as a sensor of the FSR type.

Alternatively, the control device may comprise a switch with a touch-sensitive surface of the button type.

It is understood that such a control method, in which at least one sensory feedback is generated in which the generation of an acoustic feedback is time-lagged to the generation of a vibratory feedback, produces a sequencing of the detection of a pressure making it possible to improve the sensing of the user.

The invention claimed is:

1. A method for controlling a control device with a touch-sensitive surface comprising:
at least one step in which a sensory feedback is generated which corresponds to a detection of a user pressing on the touch-sensitive surface and which comprises a haptic feedback and an acoustic feedback; and
offsetting in time the generation of the haptic feedback and the acoustic feedback, wherein the generation of the acoustic feedback is begun after that of the haptic feedback, from the moment when a value characteristic of the haptic feedback exceeds a predefined threshold, resulting in a simultaneous perception of the haptic and acoustic feedbacks by the user.

2. The method as claimed in claim 1, wherein the haptic feedback is generated for a duration D, wherein the generation of the acoustic feedback is begun from a duration substantially between 0.4*D and 0.7*D.

3. The method as claimed in claim 1, wherein a maximum amplitude of the haptic feedback coincides with a maximum amplitude of the acoustic feedback.

4. The method as claimed in claim 1, further comprising:
a detection step in which:
a value of at least one parameter characteristic of a pressure is checked,
the value is compared with at least one predefined reference value, and
if the value of said parameter is equal to or greater than said at least one predefined reference value, the control device is placed in an active pressure state and a first sensory feedback is generated.

5. The control method as claimed in claim 4, wherein the control device is placed in the active pressure state, and the detection step further comprising:
the value of at least one parameter characteristic of the detected pressure is checked,
it is compared with at least one predefined reference value,
the control device is placed in an inactive pressure state and a second sensory feedback is generated when the value of said parameter is below said reference value.

6. The method as claimed in claim 5, wherein said characteristic parameter is a force of the detected pressure.

7. The method as claimed in claim 5, wherein said characteristic parameter is a duration of the detected pressure.

8. The method as claimed in claim 5, wherein the first and the second sensory feedbacks are identical.

9. The control method as claimed in claim 5, wherein, in the first sensory feedback, a time lag between the acoustic feedback and the haptic feedback is greater than in the second sensory feedback.

10. An electric control device with a touch-sensitive surface, comprising means for applying a method for controlling the electric control device, the method comprising:
at least one step in which a sensory feedback is generated which corresponds to a detection of a user pressing on the touch-sensitive surface and which comprises a haptic feedback and an acoustic feedback; and
offsetting in time the generation of the haptic feedback and the acoustic feedback, wherein generation of the acoustic feedback is begun after that of the haptic feedback, from the moment when a value characteristic of the haptic feedback has exceeded a predefined threshold, resulting in a simultaneous perception of the haptic and acoustic feedbacks by the user.

11. The control device as claimed in claim 10, further comprising a sensor having a touch-sensitive surface sensitive to a variation of tactile pressure, such as a sensor of the FSR type.

12. The control device as claimed in claim 10, further comprising a switch with a touch-sensitive surface of the button type.

* * * * *